(12) United States Patent
Malalur et al.

(10) Patent No.: US 7,103,053 B2
(45) Date of Patent: Sep. 5, 2006

(54) GIGABIT SWITCH ON CHIP ARCHITECTURE

(75) Inventors: Govind Malalur, Fremont, CA (US); Shiri Kadambi, Los Altos, CA (US); Shekhar Ambe, Los Altos, CA (US); Mohan Kalkunte, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 747 days.

(21) Appl. No.: 09/841,189

(22) Filed: Apr. 25, 2001

(65) Prior Publication Data

US 2001/0050912 A1 Dec. 13, 2001

Related U.S. Application Data

(60) Provisional application No. 60/201,685, filed on May 3, 2000.

(51) Int. Cl.
*H04L 12/56* (2006.01)
*H04L 12/28* (2006.01)

(52) U.S. Cl. ........................... 370/401; 370/392

(58) Field of Classification Search .............. 370/392, 370/389, 401, 386, 428, 465, 469, 431, 413, 370/418, 522, 503
See application file for complete search history.

(56) References Cited

U.S. PATENT DOCUMENTS

| 5,278,789 | A | 1/1994 | Inoue et al. ............ 365/189.01 |
|---|---|---|---|
| 5,390,173 | A | 2/1995 | Spinney et al. ............ 370/393 |
| 5,414,704 | A | 5/1995 | Spinney ...................... 370/389 |
| 5,423,015 | A | 6/1995 | Chung ......................... 711/108 |
| 5,459,717 | A | 10/1995 | Mullan et al. .............. 370/351 |
| 5,473,607 | A | 12/1995 | Hausman et al. ........... 370/392 |
| 5,499,295 | A | 3/1996 | Cooper ........................ 380/270 |
| 5,524,254 | A | 6/1996 | Morgan et al. ............. 709/245 |
| 5,555,398 | A | 9/1996 | Raman ........................ 711/143 |
| 5,568,477 | A | 10/1996 | Galand et al. .............. 370/229 |
| 5,579,301 | A | 11/1996 | Ganson et al. .............. 370/229 |

(Continued)

FOREIGN PATENT DOCUMENTS

EP 0312917 A2 4/1989

(Continued)

OTHER PUBLICATIONS

Level One: "Level One™ 1XP1200 Network Processor", Advance Datasheet, 'Online', Sep. 1999, pp. 1-52.

(Continued)

*Primary Examiner*—Brian Nguyen
(74) *Attorney, Agent, or Firm*—Squire, Sanders & Dempsey, LLP (57) ABSTRACT

A data switch for network communications includes a first data port interface which supports at least one data port which transmits and receives data. A second data port interface is also provided supporting at least one data port transmitting and receiving data. A CPU interface is provided, with the CPU interface configured to communicate with a CPU. A common memory is provided, and communicates with the first data port interface and the second data port interface. A memory management unit is provided, and communicates data from the first data port interface and the second data port interface and an common memory. At least two sets of communication channels are provided, with each of the communication channels communicating data and messaging information between the first data port interface, the second data port interface, and the memory management unit. One set of communication channels provides communication from the first and second data port interfaces to the memory management unit and the other set of communication channels provides communication from the memory management unit to the first and second data port interfaces.

29 Claims, 5 Drawing Sheets

U.S. PATENT DOCUMENTS

| | | | | |
|---|---|---|---|---|
| 5,584,010 A * | 12/1996 | Kawai et al. | | 711/117 |
| 5,644,784 A | 7/1997 | Peek | | 710/24 |
| 5,652,579 A | 7/1997 | Yamada et al. | | 341/23 |
| 5,696,899 A | 12/1997 | Kalwitz | | 709/228 |
| 5,724,358 A * | 3/1998 | Headrick et al. | | 370/418 |
| 5,742,613 A | 4/1998 | MacDonald | | 714/711 |
| 5,748,631 A | 5/1998 | Bergantino et al. | | 370/398 |
| 5,781,549 A | 7/1998 | Dai | | 370/398 |
| 5,787,084 A | 7/1998 | Hoang et al. | | 370/390 |
| 5,790,539 A | 8/1998 | Chao et al. | | 370/390 |
| 5,802,052 A | 9/1998 | Venkataraman | | 370/395.72 |
| 5,802,287 A | 9/1998 | Rostoker et al. | | 370/395.5 |
| 5,825,772 A | 10/1998 | Dobbins et al. | | 370/396 |
| 5,828,653 A | 10/1998 | Goss | | 370/230 |
| 5,831,980 A | 11/1998 | Varma et al. | | 370/395.72 |
| 5,842,038 A | 11/1998 | Williams et al. | | 710/5 |
| 5,845,081 A | 12/1998 | Rangarajan et al. | | 709/224 |
| 5,887,187 A | 3/1999 | Rostoker et al. | | 712/29 |
| 5,892,922 A | 4/1999 | Lorenz | | 709/238 |
| 5,898,687 A | 4/1999 | Harriman et al. | | 370/390 |
| 5,909,686 A | 6/1999 | Muller et al. | | 707/104.1 |
| 5,918,074 A | 6/1999 | Wright et al. | | 710/52 |
| 5,940,596 A | 8/1999 | Rajan et al. | | 709/242 |
| 5,987,507 A | 11/1999 | Creedon et al. | | 709/215 |
| 6,011,795 A | 1/2000 | Varghese et al. | | 370/392 |
| 6,041,053 A | 3/2000 | Douceur et al. | | 370/389 |
| 6,061,351 A | 5/2000 | Erimli et al. | | 370/390 |
| 6,094,435 A * | 7/2000 | Hoffman et al. | | 370/414 |
| 6,119,196 A | 9/2000 | Muller et al. | | 710/243 |
| 6,175,902 B1 | 1/2001 | Runaldue et al. | | 711/159 |
| 6,185,185 B1 | 2/2001 | Bass et al. | | 370/230 |
| 6,246,680 B1 * | 6/2001 | Muller et al. | | 370/389 |
| 6,347,089 B1 * | 2/2002 | Tsui et al. | | 370/425 |
| 6,483,849 B1 * | 11/2002 | Bray et al. | | 370/465 |
| 6,570,875 B1 * | 5/2003 | Hegde | | 370/389 |
| 6,741,559 B1 * | 5/2004 | Smeulders et al. | | 370/230 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 5/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"A High Speed CMOS Circuit for 1.2-Gb/s 16×16 ATM Switching," Alain Chemarin et al. 8107 IEEE Journal of Solid-State Circuits 27(1992) Jul., No. 7, New York, US, pp. 1116-1120.

"Local Area Network Switch Frame Lookup Technique for Increased Speed and Flexibility," 700 IBM Technical Disclosure Bulletin 38(1995) Jul., No. 7, Armonk, NY, US, pp. 221-222.

"Queue Management of Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8×8 ATM Switch Chip Set with Shared Multibuffer Architecture," Harufusa Kondoh et al., 8107 IEEE Journal of Solid-State Circuits 28(1993) Jul., No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| Opcode | Ip | R | Reserved | Nxt cell | Src Dest Port | | | Cos | | J | S | E | Crc | P | O | Len | | |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| Reserved | | R | Reserved | | | | | | | | | Bc/Mc Portbitmap | | | |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| U | Res | | Untagged Portbitmap / Src Port Number (bit0..5) | | | | | | | | | | | | |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| CPU Opcodes | | | | | | | | | TimeStamp | | | | | | |

Fig. 7

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| Opcode | | | Dest Port / Destination Dev Id | | | Src Port | | | DataLen | | | E | ECode | Cos | C |
| Address | | | | | | | | | | | | | | | |
| Data | | | | | | | | | | | | | | | |

GIGABIT SWITCH ON CHIP ARCHITECTURE

REFERENCE TO RELATED APPLICATIONS

This application claims priority of U.S. Provisional Patent application Ser. No. 60/201,685, filed on May 3, 2000. The contents of the provisional application is hereby incorporated by reference.

BACKGROUND OF THE INVENTION

1. Field of the Invention

The invention relates to an apparatus for high performance switching in local area communications networks such as token ring, ATM, ethernet, fast ethernet, and gigabit ethernet environments, generally known as LANs. In particular, the invention relates to a new switching architecture in an integrated, modular, single chip solution, which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network.

Basic ethernet wirespeed is up to 10 megabits per second, and Fast Ethernet is up to 100 megabits per second. The newest ethernet is referred to as gigabit ethernet, and is capable of transmitting data over a network at a rate of up to 1,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed.

Furthermore, external CPU involvement should be avoided, since CPU involvement also makes it almost impossible to operate the switch at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, the means with which the elements communicate with each other can limit the operational speed of the switch if elements are made to wait for those communications.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The present invention is directed to a switch-on-chip solution for a network switch, capable of using ethernet, fast ethernet, and gigabit ethernet systems, wherein all of the switching hardware is disposed on a single microchip. The present invention is configured to maximize the ability of packet-forwarding at linespeed, and to also provide a modular configuration wherein a plurality of separate modules are configured on a common chip, and wherein individual design changes to particular modules do not affect the relationship of that particular module to other modules in the system.

The present invention, therefore, is related to a switch on chip architecture which utilizes a novel communication channel structure which can maximize performance. The present invention utilizes two separate communication channels, such that one channel ferries data from ports of the switch to the memory and the other channel ferries data from the memory of the switch to the ports.

The invention is therefore directed to a network switch for network communications, with the data switch including a first data port interface. The first data port interface supports at least one data port which transmit and receive data. A second data port interface is provided; the second data port interface supports at least one data port transmitting and receiving data at a second data rate. A CPU interface is provided, with the CPU interface configured to communicate with a CPU. A common memory is provided, and communicates with the first data port interface and the second data port interface. A memory management unit is provided for communicating data with the first data port interface and the second data port interface and the common memory. At least two sets of communication channels are provided, with each of the communication channels communicating data and messaging information between the first data port interface, the second data port interface, and the memory management unit. Wherein one set of communication channels provides communication from the first and second data port interfaces to the memory management unit and another set of communication channels provides communication from the memory management unit to the first and second data port interfaces.

The data switch may also be such that each set of the communication channels includes at least two separate communication channels, with the communication channels including a first channel for communicating cell data between the plurality of data ports in the first data port interface, the plurality of data ports in the second data port interface, the internal memory, and the external memory interface, and a second channel, synchronously locked with the first channel, for communicating message information corresponding to the cell data on the first channel. A third channel, independent from the first and second channel of each set, is shared for communicating sideband message information.

The network switch can, in a preferred embodiment, be integrated on a single ASIC chip. The network switch can also, in a preferred embodiment, include a plurality of semiconductor-implemented lookup tables therein, said plurality of lookup tables including address resolution lookup/layer three lookup, rules tables, and VLAN tables.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
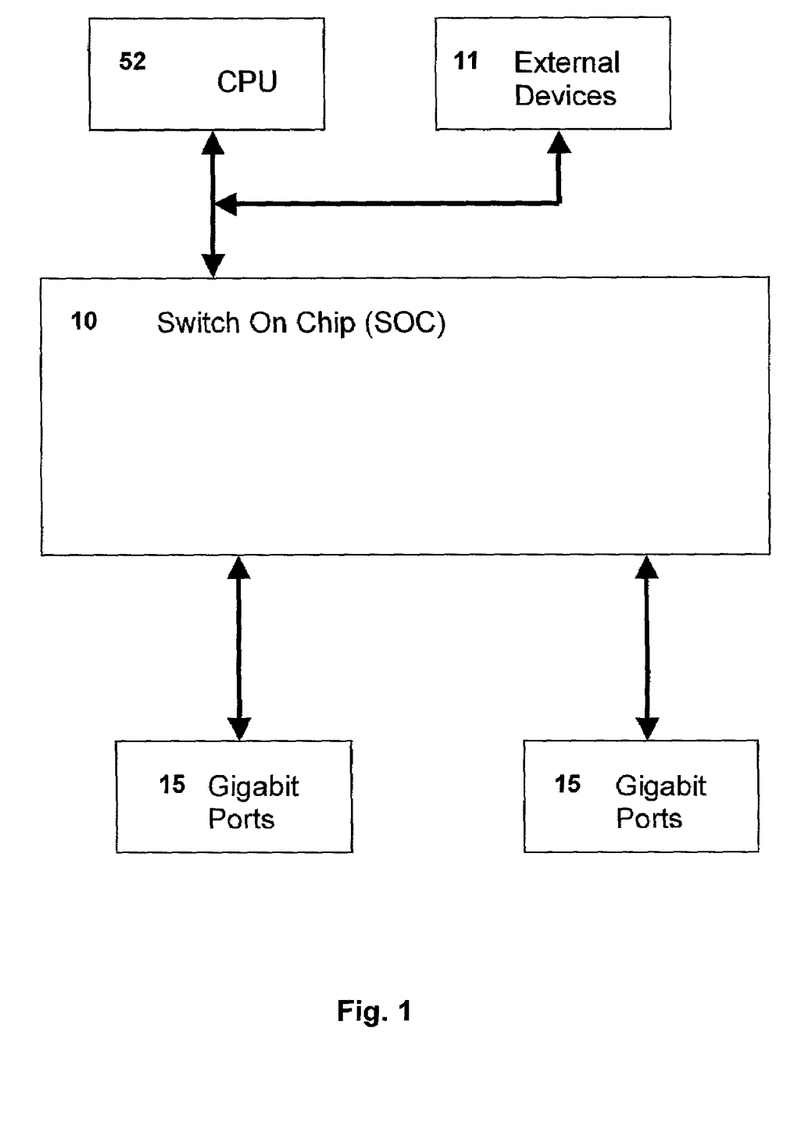
FIG. 1 is a general block diagram of elements of the present invention.

FIG. 1 illustrates a configuration wherein a switch-on-chip (SOC) 10, in accordance with the present invention, is functionally connected to external devices 11, a central processing unit (CPU) 52, and gigabit ethernet ports 15. For the purposes of this embodiment, the gigabit ethernet ports 15, which are high speed ethernet ports, are capable of operating at 1000 Mbps, but are also capable of operating at speeds ranging from 10 Mbps to 100 Mbps. External devices 11 could include other switching devices for expanding switching capabilities, or other devices as may be required by a particular application. CPU 52 can be used as necessary to program SOC 10 with rules which are appropriate to control packet processing. However, once SOC 10 is appropriately programmed or configured, SOC 10 operates, as much as possible, in a free running manner without communicating with CPU 52. Because CPU 52 does not control every aspect of the operation of SOC 10, CPU 52 performance requirements, at least with respect to SOC 10, are fairly low. A less powerful and therefore less expensive CPU 52 can therefore be used when compared to known network switches.

It should be noted that any number of gigabit ethernet ports 15 can be provided. In one embodiment, 8 gigabit ports 15 can be provided. Similarly, additional interconnect links to additional external devices 11 and CPUs 52 may be provided as necessary.

Figure 2:
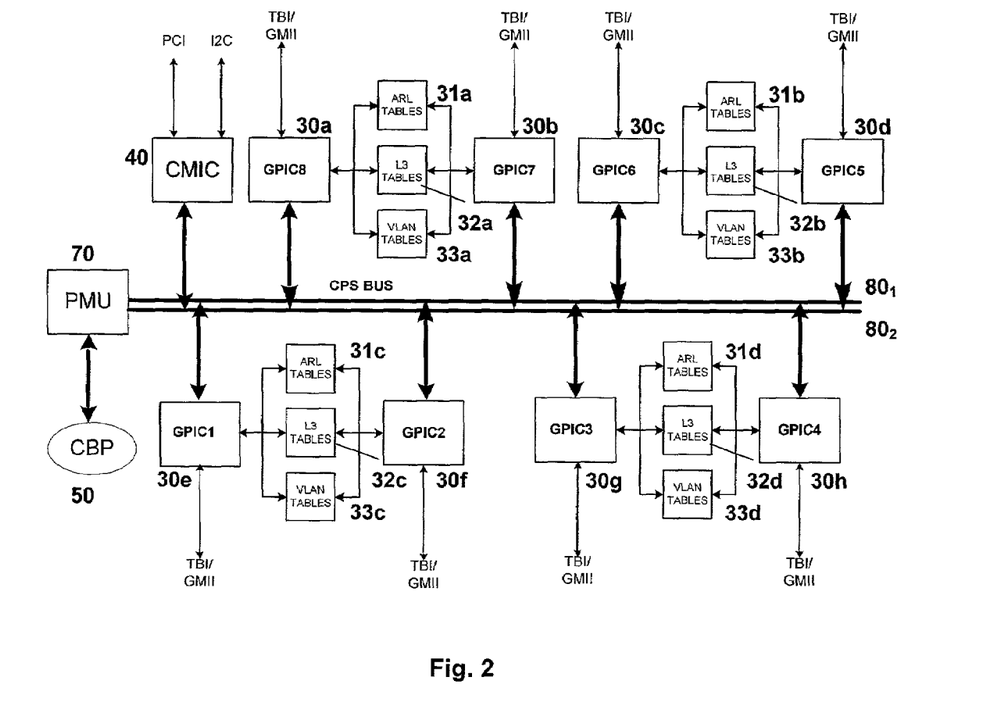
FIG. 2 is block diagram of elements of the switch on chip of the present invention.

FIG. 2 illustrates a more detailed block diagram of the functional elements of SOC 10. As evident from FIG. 2 and as noted above, SOC 10 includes a plurality of modular systems on-chip, with each modular system, although being on the same chip, being functionally separate from other modular systems. Therefore, each module can efficiently operate in parallel with other modules, and this configuration enables a significant amount of freedom in updating and re-engineering SOC 10.

SOC 10 includes a plurality of Gigabit Port Interface Controllers (GPIC) 30a, 30b, etc., a CPU Management Interface Controller (CMIC) 40, a Common Buffer Memory Pool (CBP) 50, a Pipelined Memory Management Unit (PMMU) 70 and two system-wide bus structures, each referred to as a CPS channel, $80_1$, and $80_2$.

Each CPS channel, $80_1$, or $80_2$, comprises C channel 81, P channel 82, and S channel 83. The CPS channel is also referred to as the Cell Protocol Sideband Channel, and each channel is a 17 Gbps channel which glues or interconnects the various modules together. Although not illustrated in FIG. 2, other high speed interconnects can be provided, such as an extendible high speed interconnect. This interconnect can be in the form of an interconnect port interface controller, which is capable of interfacing CPS channels $80_1$ and $80_2$ to external devices 11 through an extendible high speed interconnect link.

As will be discussed below, each GPIC 30a–30h, generally referred to as GPIC 30, are closely interrelated with appropriate address resolution logic and layer three switching tables 32a, 32b, 32c, 32d, rules tables 31a, 31b, 31c, 31d, and VLAN tables 33a, 33b, 33c, 33d. These tables will be generally referred to as 31, 32, and 33, respectively.

As is known in the art, auto-negotiation is an aspect of fast ethernet, wherein the network is capable of negotiating a highest communication speed between a source and a destination based on the capabilities of the respective devices. The communication speed can vary, as noted previously, between 10 Mbps, 100 Mbps and 1000 Mbps; auto negotiation capability, therefore, is built directly into each GPIC module. The address resolution logic (ARL) and layer three tables (ARL/L3) 31a, 31b, 31c, and 31d, rules table 32a, 32b, 32c, and 32d, and VLAN tables 33a, 33b, 33c, and 33d are configured to be part of or interface with the associated GPIC in an efficient and expedient manner, also to support wirespeed packet flow.

Each GPIC 30 supports one gigabit ethernet port and has separate ingress and egress functions. Additionally, each GPIC port interfaces to the network medium utilizing a gigabit media independent interface (GMII). On the ingress side, self-initiated and CPU-initiated learning of level 2 address information can occur. Address resolution logic (ARL) is utilized to assist in this task. Address aging is built in as a feature, in order to eliminate the storage of address information which is no longer valid or useful. Layer two lookups, Layer three lookups and filtering occur simultaneously to achieve a high level of performance. On the egress side, the GPIC is capable of supporting packet polling based either as an egress management or class of service (COS) function. Rerouting/scheduling of packets to be transmitted can occur, as well as head-of-line (HOL) blocking notification, packet aging, cell reassembly, and other functions associated with the port interface.

CMIC 40 acts as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI64.

Common buffer memory pool or CBP 50 can be considered to be the on-chip data memory. In one embodiment of the invention, the CBP 50 is high speed SRAM memory, to maximize performance and minimize hardware overhead requirements. The CBP can have a size of, for example, 720 kilobytes running at 132 MHz. Packets stored in the CBP 50 are typically stored as cells, rather than packets.

Figure 3:
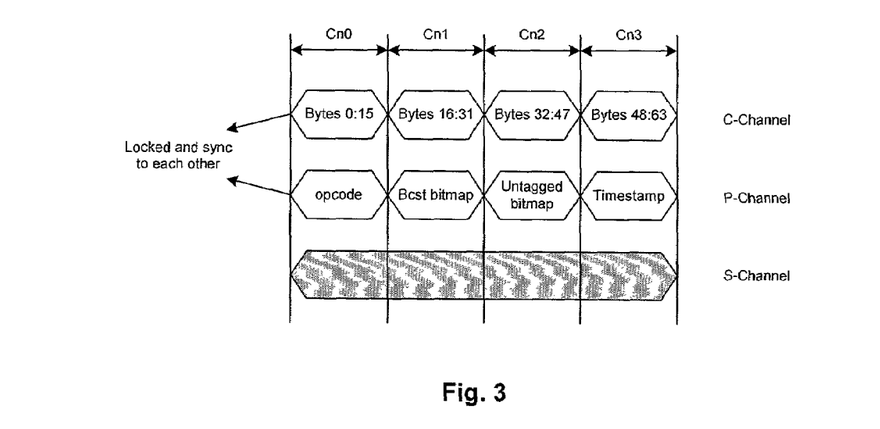
FIG. 3 is a data flow diagram of a packet showing the CPS channels.

As shown in FIG. 3, each CPS channel, 80$_1$ or 80$_2$, is actually two separate channels, referred to as the C-channel, the P-channel, and a shared S-channel. The C-channel is 128 bits wide, and runs at 132 MHz. Packet transfers between ports occur on the C-channel. Since this channel is used solely for data transfer, there is no overhead associated with its use. The P-channel or protocol channel is synchronous or locked with the C-channel. During cell transfers, the message header is sent via the P-channel by the PMMU. The P-channel is 32 bits wide, and runs at 132 MHz.

The S or sideband channel runs at 132 MHz, and is 32 bits wide. The S-channel is used for functions such as for conveying Port Link Status, receive port full, port statistics, ARL table synchronization, memory and register access to CPU and other CPU management functions, and global memory full and common memory full notification.

The present invention, as discussed above, has a dual CP bus to enable a non-blocking solution. One bus is used for communication from a GPIC to the memory and the other bus is used for sending packets from the memory to the GPIC's egress port. In prior art switches having a single bus, and serving the flow of packets in both directions, a "turn-around" clock cycle is necessary between sending and receiving for each GPIC. Through the use of two buses, the actual throughput is doubled, as compared to a single bus operating at the same speed, since the receiving and the sending are served by separate buses and an additional saving in clock cycles is obtained because the buses no longer require a "turnaround." The elimination of the turn-around through the dual bus structure contributes an extra 20% increase above the doubled throughput.

A proper understanding of the operation of SOC 10 requires a proper understanding of the operation of CPS channel 80. Referring to FIG. 3, it can be seen that in SOC 10, on the ingress, packets are sliced by a GPIC 30 into 64-byte cells. In the SOC, incoming packets are sliced into cells which are 64 bytes long as discussed above, and the cells are further divided into four separate 16 byte cell blocks Cn0 . . . Cn3. Locked with the C-channel is the P-channel, which locks the opcode in synchronization with Cn0. A port bit map is inserted into the P-channel during the phase Cn1. The untagged bit map is inserted into the P-channel during phase Cn2, and a time stamp is placed on the P-channel in Cn3. Independent from occurrences on the C and P-channel, the S-channel is used as a sideband, and is therefore decoupled from activities on the C and P-channel.

Cell or C-Channel

Figure 4:
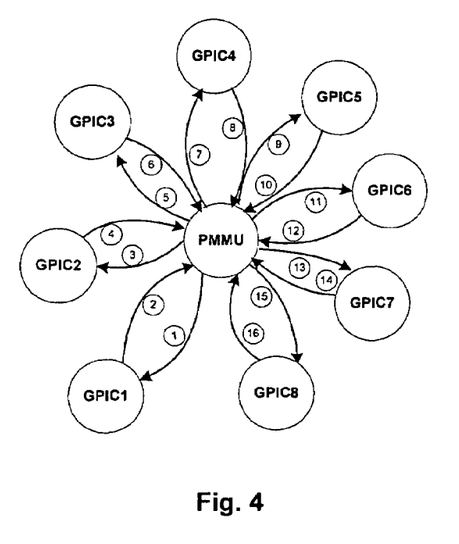
FIG. 4 illustrates the C-channel arbitration mechanism.
Figure 5:
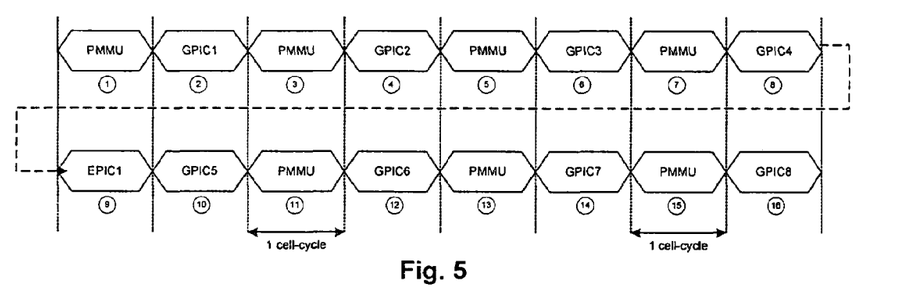
FIG. 5 illustrates the timing of the C-channel.
Figure 6:
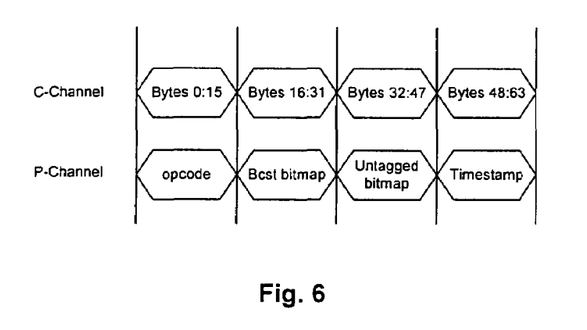
FIG. 6 illustrates the cell channel format.

Arbitration for the CPS channel occurs out of band. Every module (GPIC, etc.) monitors the channel, and matching destination ports respond to appropriate transactions. C-channel arbitration is a demand priority round robin arbitration mechanism. If no requests are active, however, the default module, which can be selected during the configuration of SOC 10, can park on the channel and have complete access thereto. If all requests are active, the configuration of SOC 10 is such that the PMMU is granted access every other cell cycle, and the GPICs 30 share equal access to the C-channel on a round robin basis. FIGS. 4 and 5 illustrate a C-channel arbitration mechanism wherein section A is the PMMU, and section B consists of eight GPICs. The sections alternate access, and since the PMMU is the only module in section A, it gains access every other cycle. The modules in section B, as noted previously, obtain access on a round robin basis.

Protocol or P-Channel

Figure 7:
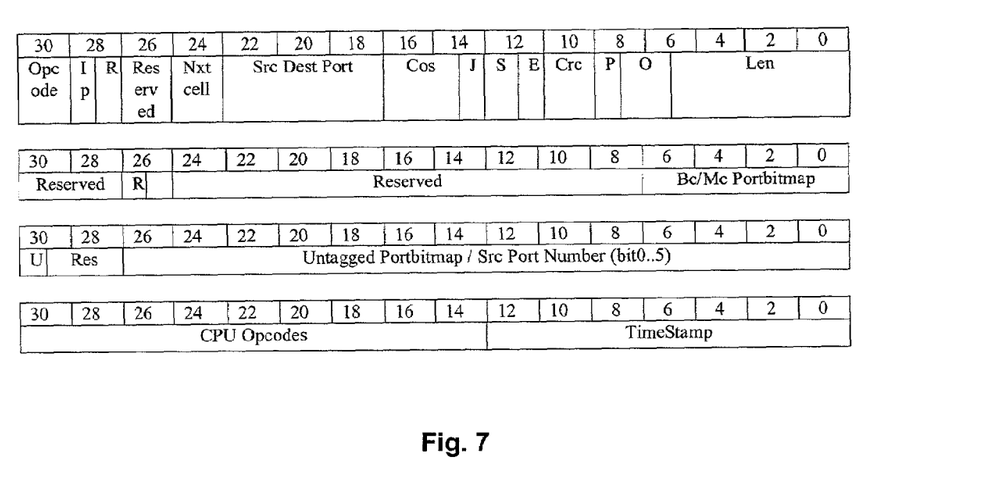
FIG. 7 illustrates structure of the protocol channel messages.

Referring once again to the protocol or P-channel and FIG. 7, a plurality of messages can be placed on the P-channel in order to properly direct flow of data flowing on the C-channel. Since P-channel 82 is 32 bits wide, and a message typically requires 128 bits, four smaller 32 bit messages are put together in order to form a complete P-channel message. The following list identifies the fields and function and the various bit counts of the 128 bit message on the P-channel:

Opcode—2 bits long—Identifies the type of message present on the C channel 81;

IP Bit—1 bit long—This bit is set to indicate that the packet is an IP switched packet;

Next Cell—2 bits long—A series of values to identify the valid bytes in the corresponding cell on the C channel 81;

SRC DEST Port—6 bits long—Defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet;

CRC—2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

O—2 bits—Defines an optimization for processing by the CPU 52; and

Bc/Mc Bitmap—28 bits—Defines the broadcast or multicast bitmap. Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port field. The untagged bits identifies the egress ports which will strip the tag header, and the source port bits identifies the port number upon which the packet has entered the switch;

U Bit—1 bit long—For a particular Opcode selection (0×01, this bit being set indicates that the packet should leave the port as Untagged; in this case, tag stripping is performed by the appropriate MAC;

Time Stamp—14 bits—The system puts a time stamp in this field when the packet arrives, with a granularity of 1 μsec;

CPU Opcode—18 bits long—These bits are set if the packet is being sent to the CPU for any reason. Opcodes are defined based upon filter match, learn bits being set, routing bits, destination lookup failure (DLF), station movement, etc.

The opcode field of the P-channel message defines the type of message currently being sent. While the opcode is currently shown as having a width of 2 bits, the opcode field can be widened as desired to account for new types of messages as may be defined in the future. Graphically, however, the P-channel message type defined above is shown in FIG. 7.

An early termination message is used to indicate to PMMU that the current packet is to be terminated. During operation, as discussed in more detail below, the status bit (S) field in the message is set to indicate the desire to purge the current packet from memory. Also in response to the status bit all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid for the last cell of a packet being transmitted as defined by the E bit field of the message.

Last, the time stamp field of the message has a resolution of 1 μs and is valid only for the first cell of the packet defined by the S bit field of the message. A cell is defined as the first cell of a received packet when the S bit field of the message is set to a logical one value.

As is described in more detail below, the C channel 81 and the P channel 82 making up the CPS channels 80$_1$ and 80$_2$, are synchronously tied together such that data on C channel 81 is transmitted over the CPS channel 80 while a corresponding P channel message is simultaneously transmitted.

S-Channel or Sideband Channel

The S channel 83 is a 32-bit wide channel which provides a separate communication path within the SOC 10. The S channel 83 is used for management by CPU 52, SOC 10 internal flow control, and SOC 10 inter-module messaging. The S channel 83 is a sideband channel of the CPS channel 80, and is electrically and physically isolated from the C channel 81 and the P channel 82. It is important to note that since the S channel is separate and distinct from the C channel 81 and the P channel 82 of each set of channels, operation of the S channel 83 can continue without performance degradation related to the C channel 81 and P channel 82 operation. Conversely, since the C channel is not used for the transmission of system messages, but rather only data, there is no overhead associated with the C channel 81 and, thus, the C channel 81 is able to free-run as needed to handle incoming and outgoing packet information.

The S channel 83 of CPS channel 80 provides a system wide communication path for transmitting system messages, for example, providing the CPU 52 with access to the control structure of the SOC 10. System messages include port status information, including port link status, receive port full, and port statistics, ARL table 22 synchronization, CPU 52 access to the CBP 50 memory buffer and SOC 10 control registers, and memory full notification corresponding to CBP 50.

Figure 8:
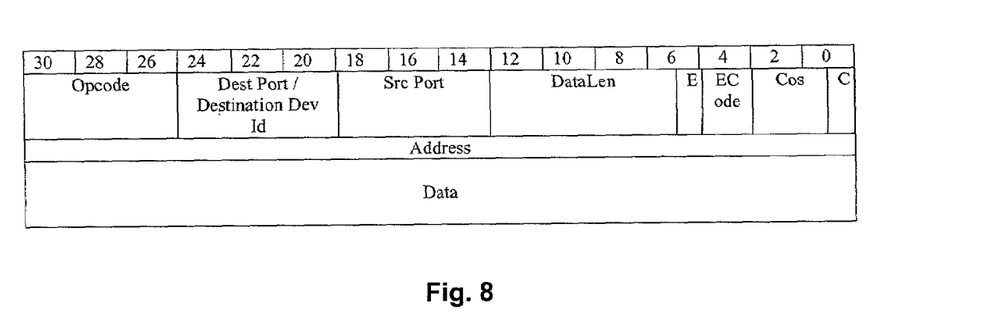
FIG. 8 illustrates structure of the side band channel messages.

FIG. 8 illustrates a message format for an S channel message on S channel 83. The message is formed of four 32-bit words; the bits of the fields of the words are defined as follows:

Opcode—6 bits long—Identifies the type of message present on the S channel;

Dest Port—6 bits long—Defines the port number to which the current S channel message is addressed;

Src Port—6 bits long—Defines the port number of which the current S channel message originated;

COS—3 bits long—Defines the class of service associated with the current S channel message; and C bit—1 bit long—Logically defines whether the current S channel message is intended for the CPU 52.

Error Code—2 bits long—Defines a valid error when the E bit is set;

DataLen—7 bits long—Defines the total number of data bytes in the Data field;

E bit—1 bit long—Logically indicates whether an error has occurred in the execution of the current command as defined by opcode;

Address—32 bits long—Defines the memory address associated with the current command as defined in opcode;

Data—0—127 bits long—Contains the data associated with the current opcode.

With the configuration of CPS channel 80 as explained above, the decoupling of the S channel from the C channel and the P channel is such that the bandwidth on the C channel can be preserved for cell transfer, and that overloading of the C channel does not affect communications on the sideband channel.

The configuration of the SOC 10 supports gigabit ports, and extendible interconnect links as discussed above. The SOC configuration can also be "stacked", thereby enabling significant port expansion capability. Once data packets have been received by SOC 10, sliced into cells, and placed on CPS channel 80, stacked SOC modules can interface with the CPS channels and monitor the channels, and extract appropriate information as necessary. As will be discussed below, a significant amount of concurrent lookups and filtering occurs as the packet comes in to ingress submodule the GPIC 30, with respect to layer two and layer three lookups, and fast filtering.

It should be noted that each GPIC 30 has an ingress submodule and egress submodule, which provide port specific ingress and egress functions. All incoming packet processing occurs in ingress submodule, and features such as the fast filtering processor, layer two (L2) and layer three (L3) lookups, layer two learning, both self initiated and CPU 52 initiated, layer two table management, layer two switching, packet slicing, and channel dispatching occur in ingress submodule. After lookups, fast filter processing, and slicing into cells, as noted above and as will be discussed below, the packet is placed from ingress submodule into dispatch unit, and then placed onto CPS channel $80_1$ and memory management is handled by PMMU 70. A number of ingress buffers are provided in dispatch unit to ensure proper handling of the packets/cells. Once the cells or cellularized packets are placed onto the CPS channel $80_1$, the ingress submodule is finished with the packet. The ingress is not involved with dynamic memory allocation, or the specific path the cells will take toward the destination.

Egress submodule monitors CPS channel $80_2$ and continuously looks for cells destined for a port of that particular GPIC 30. When the PMMU 70 receives a signal that an egress associated with a destination of a packet in memory is ready to receive cells, PMMU 70 pulls the cells associated with the packet out of the memory, as will be discussed below, and places the cells on CPS channel $80_2$, destined for the appropriate egress submodule. A FIFO in the egress submodule continuously sends a signal onto the CPS channel $80_2$ that it is ready to receive packets, when there is room in the FIFO for packets or cells to be received. As noted previously, the CPS channels $80_1$ and $80_2$ are configured to handle cells, but cells of a particular packet are always handled together to avoid corrupting of packets.

In order to overcome data flow degradation problems associated with overhead usage of the C channel 81, all L2 learning and L2 table management is achieved through the use of the S channel 83. L2 self-initiated learning is achieved by deciphering the source address of a station at a given ingress port utilizing the packet's associated address. Once the identity of the station at the ingress port is determined, the ARL/L3 tables, 31 and 32, are updated to reflect the station identification. The ARL/L3 tables 31 & 32 of the GPICs 30 are updated to reflect the newly acquired station identification in a synchronizing step.

Table management may also be achieved through the use of the CPU 52. CPU 52, via the CMIC 40, can provide the SOC 10 with software functions which result in the designation of the identification of a station at a given port. As discussed above, it is undesirable for the CPU 52 to access the packet information in its entirety since this would lead to performance degradation. Rather, the SOC 10 is programmed by the CPU 52 with identification information concerning the station. The SOC 10 can maintain real-time data flow since the table data communication between the CPU 52 and the SOC 10 occurs exclusively on the S channel 83. While the SOC 10 can provide the CPU 52 with direct packet information via the C channel 81, such a system setup is undesirable for the reasons set forth above. As stated above, as an ingress function an address resolution lookup is performed by examining the ARL table 31. If the packet is addressed to one of the layer three (L3) switches of the SOC 10, then the ingress submodule performs the L3 and default table lookup. Once the destination port has been determined, the GPIC 30 sets a ready flag in the dispatch unit which then arbitrates for C channel 81.

The C channel 81 arbitration scheme, as discussed previously and as illustrated in FIGS. 4 and 5, is Demand Priority Round-Robin. Each I/O module, GPIC 30, and CMIC 40, along with the PMMU 70, can initiate a request for C channel access. If no requests exist at any one given time, a default module established with a high priority gets complete access to the C channel 81. If any one single I/O module or the PMMU 70 requests C channel 81 access, that single module gains access to the C channel 81 on-demand.

If GPIC modules 30 and CMIC 40 simultaneously request C channel access, then access is granted in round-robin fashion. For a given arbitration time period each of the I/O modules would be provided access to the C channel 81. For example, each GPIC module 30 would be granted access, followed by the CMIC 40. After every arbitration time period the next I/O module with a valid request would be given access to the C channel 81. This pattern would continue as long as each of the I/O modules provide an active C channel 81 access request.

If all the I/O modules, including the PMMU 70, request C channel 81 access, the PMMU 70 is granted access as shown in FIG. 5 since the PMMU provides a critical data path for all modules on the switch. Upon gaining access to the channel 81, the dispatch unit proceeds in passing the received packet, one cell at a time, to C channel 81.

Referring again to FIG. 3, the individual C, P, and S channels of the CPS channels $80_1$ and $80_2$ are shown. Once the dispatch unit has been given permission to access the CPS channel $80_1$, during the first time period Cn0, the dispatch unit places the first 16 bytes of the first cell of the received packet on the C channel $81_1$. Concurrently, the dispatch unit places the first P channel message corresponding to the currently transmitted cell. As stated above, the first P channel message defines, among other things, the message type. Therefore, this example is such that the first P channel message would define the current cell as being a unicast type message to be directed to the destination egress port.

During the second clock cycle Cn1, the second 16 bytes (16:31) of the currently transmitted data cell are placed on the C channel 81. Likewise, during the second clock cycle Cn1, the Bc/Mc Port Bitmap is placed on the P channel 82.

As indicated by the hatching of the S channel 83 data during the time periods Cn0 to Cn3 in FIG. 3, the operation of the S channel 83 is decoupled from the operation of the C channel 81 and the P channel 82. For example, the CPU 52, via the CMIC 40, can pass system level messages to non-active modules while an active module passes cells on the C channel 81. As previously stated, this is an important aspect of the SOC 10 since the S channel operation allows parallel task processing, permitting the transmission of cell data on the C channel 81 in real-time. Once the first cell 112a of the incoming packet 112 is placed on the CPS channel 80 the PMMU 70 determines whether the cell is to be transmitted to an egress port 21 local to the SOC 10.

If the PMMU 70 determines that the current cell on the C channel 81 is destined for an egress port of the SOC 10, the PMMU 70 takes control of the cell data flow.

When PMMU 70 determines that cell is destined for an appropriate egress port on SOC 10, PMMU 70 controls the cell flow from CPS channel 80 to CBP 50. As the data packet is received at PMMU 70 from CPS 80, a manager determines whether or not sufficient memory is available in CBP 50 for the data packet. A free address pool (not shown) can provide storage for at least two cell pointers per egress manager, per class of service. If sufficient memory is available in CBP 50 for storage and identification of the incoming data packet, the manager places the data cell information on CPS channel 80. The data cell information is provided by the manger to CBP 50 at the assigned address. As new cells are received by PMMU 70, the manager assigns cell pointers. This corresponding cell pointer is stored as a two byte or 16 bit value NC_header, in an appropriate place on a control message, with the initial pointer to the corresponding egress manager, and successive cell pointers as part of each cell header, a linked list of memory pointers is formed which defines packet, when the packet is transmitted via the appropriate egress port.

Once the packet is fully written into CBP 50, a corresponding CBP Packet Identifier (CPID) is provided to the appropriate egress manager; where this CPID points to the memory location of initial cell. The CPID for the data packet is then used when the data packet is sent to the destination egress port. In actuality, the manager maintains two buffers containing a CBP cell pointer, with admission to the CBP being based upon a number of factors.

When a packet has been received and stored in CBP 50, a CPID is provided to the associated egress manager. The total number of data cells associated with the data packet is stored in a budget register (not shown). As more data packets are received and designated to be sent to the same egress manager, the value of the budget register corresponding to the associated egress manager is incremented by the number of data cells of the new data cells received. The budget register therefore dynamically represents the total number of cells designated to be sent by any specific egress port on a GPIC 30. The PMMU manager controls the inflow of additional data packets by comparing the budget register to a high watermark register value or a low watermark register value, for the same egress.

When the value of the budget register exceeds the high watermark value, the associated ingress port is disabled. Similarly, when data cells of an egress manager are sent via the egress port, and the corresponding budget register decreases to a value below the low watermark value, the ingress port is once again enabled. When egress manager initiates the transmission of packet, the egress manager notifies the manager, which then decrements the budget register value by the number of data cells which are transmitted. The specific high watermark values and low watermark values can be programmed by the station via CPU 52. This gives the station control over the data flow of any port on any GPIC 30.

When the packet comes in from the ingress port the decision to accept the frame for learning and forwarding is done based on several ingress rules. These ingress rules are based on the Protocols and Filtering Mechanisms supported in the switch. The protocols which decide these rules are 802.1d (Spanning Tree Protocol), 802.1p and 802.1q. Extensive Filtering Mechanism with inclusive and exclusive Filters is supported. These Filters are applied on the ingress side and depending on the outcome different actions are taken. Some of the actions may involve changing the 802.1p priority in the packet Tag header, changing the Type Of Service (TOS) Precedence field in the IP Header or changing the egress port.

Figure 9:
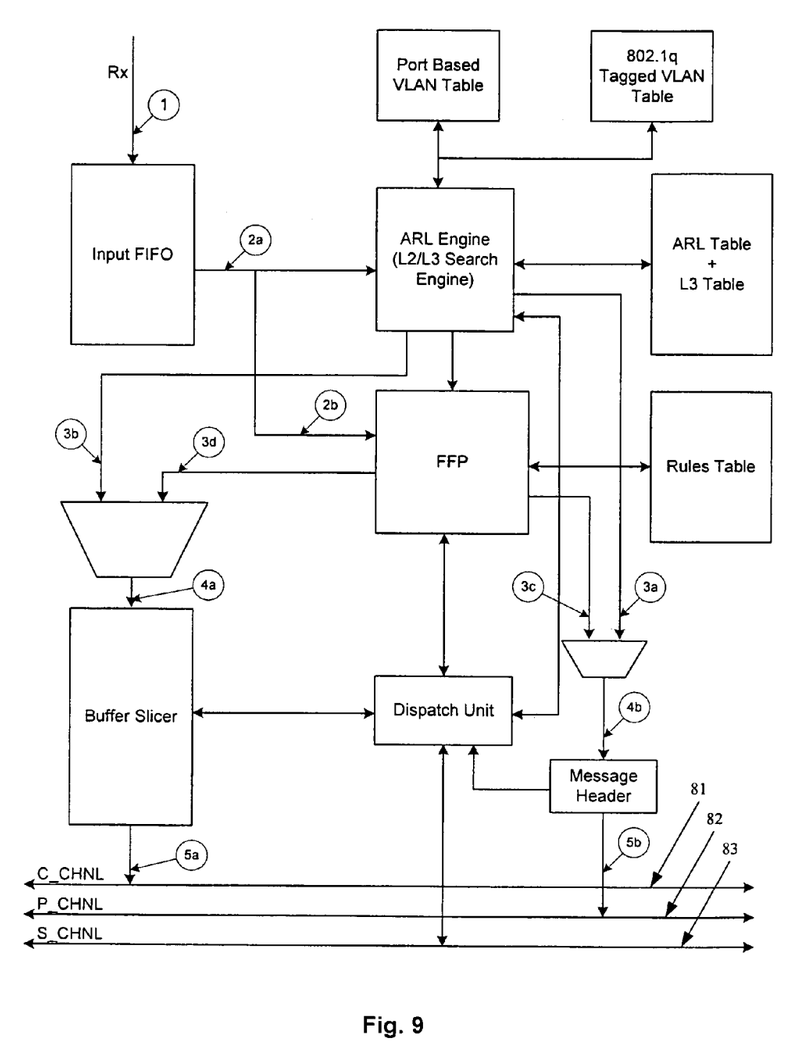
FIG. 9 illustrates data flow in ingress in the switch of the present invention.

The data flow on the ingress into the switch will now be discussed with respect to FIG. 9. As the packet comes in, it is put in the Input FIFO, as shown in step 1. An Address Resolution Request is sent to the ARL Engine as soon as first 16 bytes arrive in the Input FIFO (2a). If the packet has 802.1q Tag then the ARL Engine does the lookup based on 802.1q Tag in the TAG BASED VLAN TABLE. If the packet does not contain 802.1q Tag then ARL Engine gets the VLAN based on the ingress port from the PORT BASED VLAN TABLE. Once the VLAN is identified for the incoming packet, ARL Engine does the ARL Table search based on Source Mac Address and Destination Mac Address. The key used in this search is Mac Address+VLAN Id. If the result of the ARL search is one of the L3 Interface Mac Address, then it does the L3 search to get the Route Entry. If an L3 search is successful then it modifies the packet as per Packet Routing Rules.

At step 2b, a Filtering Request is sent to Fast Filtering Processor (FFP) as soon as first 64 bytes arrive in the Input FIFO. The outcome of the ARL search, step 3a, is the egress port/ports, the Class Of Service (COS), Untagged Port Bitmap and also in step 3b the modified packet in terms of Tag Header, or L3 header and L2 Header as per Routing Rules. The FFP applies all the configured Filters and results are obtained from the RULES TABLE.

The outcome of the Filtering Logic, at 3c, decides if the packet has to be discarded, sent to the CPU or, in 3d, the packet has to be modified in terms of 802.1q header or the TOS Precedence field in the IP Header. If the TOS Precedence field is modified in the IP Header then the IP Checksum needs to be recalculated and modified in the IP Header.

The outcome of FFP and ARL Engine, in 4a, are applied to modify the packet in the Buffer Slicer. Based on the outcome of ARL Engine and FFP, 4b, the Message Header is formed ready to go on the Protocol Channel. The Dispatch Unit sends the modified packet over the cell Channel, in 5a, and at the same time, in 5b, sends the control Message on the Protocol Channel. The Control Message contains the information such as source port number, COS, Flags, Time Stamp and the bitmap of all the ports on which the packet should go out and Untagged Bitmap.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A network switch for network communications, said network switch comprising:
   a first data port interface, said first data port interface supporting at least one data port transmitting and receiving data;
   a second data port interface, said second data port interface supporting at least one data port transmitting and receiving data;
   a CPU interface, said CPU interface configured to communicate with a CPU;
   a common memory, said common memory communicating with said first data port interface and said second data port interface;
   a memory management unit, said memory management unit for communicating data from said first data port interface and said second data port interface and said common memory; and
   at least two sets of communication channels, with each of said communication channels communicating data and messaging information between said first data port interface, said second data port interface, and said memory management unit,
   wherein one set of communication channels of the at least two sets of communication channels provides communication from said first and second data port interfaces to said memory management unit and another set of communication channels of the at least two sets of communication channels provides communication from said memory management unit to said first and second data port interfaces,
   wherein the first data port interface, the second data port interface, the CPU interface, the common memory, the memory management unit and the at least two sets of communication channels are embodied on a single substrate,
   wherein each set of said at least two sets of communication channels comprises three communication channels, and
   wherein said three communication channels include a first channel for communicating cell data between data ports of the first data port interface, data ports of the second data port interface, and the common memory, a second channel, synchronously locked with the first channel, for communicating message information corresponding to the cell data on the first channel, and a third channel, shared between the sets of communication channels, independent from said first and second channel, for communicating sideband message information.

2. A network switch for network communications, said network switch comprising:
   a first data port interface, said first data port interface supportmnn at least one data port transmitting and receiving data;
   a second data port interface, said second data port interface supporting at least one data port transmitting and receiving data;
   a CPU interface, said CPU interface configured to communicate with a CPU;
   a common memory, said common memory communicating with said first data port interface and said second data port interface;
   a memory management unit, said memory management unit for communicating data from said first data port interface and said second data port interface and said common memory; and
   at least two sets of communication channels, with each of said communication channels communicating data and messaging information between said first data port interface, said second data port interface, and said memory management unit,
   wherein one set of communication channels of the at least two sets of communication channels provides communication from said first and second data port interfaces to said memory management unit and another set of communication channels of the at least two sets of communication channels provides communication from said memory management unit to said first and second data port interfaces.
   wherein the first data port interface, the second data port interface, the CPU interface, the common memory, the memory management unit and the at least two sets of communication channels are embodied on a single substrate, and
   wherein said CPU interface is configured to provide communication between a remote CPU and the at least two sets of communication channels, wherein said remote CPU can program operations of the memory management unit while one of the first and second data port interfaces are receiving or transmitting data.

3. A network switch as recited in claim 2, wherein each set of said at least two sets of communication channels comprises three communication channels.

4. A network switch as recited in claim 2, wherein at least one of said first and second data port interfaces is a gigabit data port interface.

5. A network switch as recited in claim 2, wherein said first data port interface, said second data port interface, said CPU interface, said common memory, said memory management unit, and said at least two sets of communication channels are integrated on a single application specific integrated circuit (ASIC) chip.

6. A network switch as recited in claim 2, wherein said first data port interface, said second data port interface, said CPU interface, said common memory, said memory management unit, and said at least two sets of communication channels are configured to perform layer two switching at wirespeed.

7. A network switch as recited in claim 2, wherein said first data port interface, said second data port interface, said CPU interface, said common memory, said memory management unit, and said at least two sets of communication channels are configured to perform layer three switching at wirespeed.

8. A network switch as recited in claim 2, wherein said CPU interface is configured to provide communication between the remote CPU and a sideband channel of the at least two sets of communication channels.

9. A network switch as recited in claim 2, said network switch including a plurality of semiconductor-implemented lookup tables therein, said plurality of lookup tables including address resolution lookup/layer three lookup, rules tables, and VLAN tables.

10. A network switch as recited in claim 9, wherein said first data port interface communicates table information with said second data port interface, such that incoming address information can be updated at a plurality of data port interfaces while the information is received at one data port interface.

11. A network switch as recited in claim 2, wherein said first data port interface includes an auto-negotiating unit for negotiating a maximum communication speed between a source data port and a destination data port.

12. A network switch for netxvork communications, said network switch comprising:
- a first data port interface, said first data port interface supporting at least one data port transmitting and receiving data;
- a second data port interface, said second data port interface supporting at least one data port transmitting and receiving data;
- a CPU interface, said CPU interface configured to communicate with a CPU;
- a common memory, said common memory communicating with said first data port interface and said second data port interface;
- a memory management unit, said memory management unit for communicating data from said first data port interface and said second data port interface and said common memory; and
- at least two sets of communication channels, with each of said communication channels communicating data and messaging information between said first data port interface, said second data port interface, and said memory management unit,
- wherein one set of communication channels of the at least two sets of communication channels provides communication from said first and second data port interfaces to said memory management unit and another set of communication channels of the at least two sets of communication channels provides communication from said memory management unit to said first and second data port interfaces,
- wherein the first data port interface, the second data port interface, the CPU interface, the common memory, the memory management unit and the at least two sets of communication channels are embodied on a single substrate,
- said network switch including a plurality of semiconductor-implemented lookup tables therein, said plurality of lookup tables including address resolution lookup/layer three lookup, rules tables, and VLAN tables, and
- wherein said first data port interface and said second data port interface share a common address lookup/layer three table, and a common VLAN table, and wherein each of the first data port interface and the second data port interface has a unique rules table associated therewith.

CLAIM 13. A network switch for network communications, said network switch comprising;
- first data means providing a first data port interface supporting at least one data port transmitting and receiving data;
- second data means providing a second data port interface supporting at least one data port transmitting and receiving data;
- interface means providing an interface configured to communicate with a CPU;
- means for storing data, said means for storing data communicating with said first data means and said second data means;
- means for managing memory, said means for managing memory communicating data from said first data means and said second data means and said means for storing data; and
- at least two sets of communication channel means, with each of said communication channel means communicating data and messaging information between said first data means, said second data means, and said means for managing memory,
- wherein one set of communication channel means of the at least two sets of communication channel means provides communication from said first and second data means to said means for managing memory and another set of communication channel means of the at least two sets of communication channel means provides communication from said means for managing memory to said first and second data means,
- wherein the first data means, the second data means, the interface means, the means for storing data, the means for managing memory and the at least two sets of communication channel means are embodied on a single substrate,
- wherein each set of said at least two sets of communication channel means comprises three communication channels, and
- wherein said three communication channels include a first channel for communicating cell data between data ports of the first data port interface, data ports of the second data port interface, and the means for storing data, a second channel, synchronously locked with the first channel, for communicating message information corresponding to the cell data on the first channel, and a third channel, shared between the sets of communication channels, independent from said first and second channel, for communicating sideband message information.

CLAIM 14. A network switch for network communications, said network switch comprising:
- first data means providing a first data port interface supporting at least one data port transmitting and receiving data;
- second data means providing a second data port interface supporting at least one data port transmitting and receiving data;
- interface means providing an interface configured to communicate with a CPU;
- means for storing data, said means for storing data communicating with said first data means and said second data means;
- means for managing memory, said means for managing memory communicating data from said first data means and said second data means and said means for storing data; and
- at least two sets of communication channel means, with each of said communication channel means communicating data and messaging information between said first data means, said second data means, and said means for managing memory,
- wherein one set of communication channel means of the at least two sets of communication channel means provides communication from said first and second data means to said means for managing memory and another set of communication channel means of the at least two sets of communication channel means provides communication from said means for managing memory to said first and second data means.
- wherein the first data means, the second data means, the interface means, the means for storing data, the means for managing memory and the at least two sets of communication channel means are embodied on a single substrate, and
- wherein said interface means is configured to provide communication between a remote CPU and the at least two sets of communication channel means, wherein said remote CPU can program operations of the means for managing memory while one of the first and second data means are receiving or transmitting data.

15. A network switch as recited in claim 14, wherein each set of said at least two sets of communication channel means comprises three communication channels.

16. A network switch as recited in claim 14, wherein at least one of said first and second data means is a gigabit data port interface.

17. A network switch as recited in claim 14, wherein said first data means, said second data means, said interface means, said means for storing data, said means for managing memory, and said at least two sets of communication channel means are integrated on a single application specific integrated circuit (ASIC) chip.

18. A network switch as recited in claim 14, wherein said first data means, said second data means, said interface means, said means for storing data, said means for managing memory, and said at least two sets of communication channel means are configured to perform layer two switching at wirespeed.

19. A network switch as recited in claim 14, wherein said first data means, said second data means, said interface means, said means for storing data, said means for managing memory, and said at least two sets of communication channel means are configured to perform layer three switching at wirespeed.

20. A network switch as recited in claim 14, wherein said interface means is configured to provide communication between the remote CPU and a sideband channel of the at least two sets of communication channel means.

21. A network switch as recited in claim 14, said network switch including a plurality of semiconductor-implemented lookup tables therein, said plurality of lookup tables including address resolution lookup/layer three lookup, rules tables, and VLAN tables.

22. A network switch as recited in claim 21, wherein said first data means communicates table information with said second data means, such that incoming address information can be updated at a plurality of data port means while the information is received at one data means.

23. A network switch as recited in claim 14, wherein said first data means includes an auto-negotiating means for negotiating a maximum communication speed between a source data port and a destination data port.

24. A network switch for network communications, said network switch comprising:
first data means providing a first data port interface supporting at least one data port transmitting and receiving data;
second data means providing a second data port interface supporting at least one data port transmitting and receiving data;
interface means providing an interface configured to communicate with a CPU;
means for storing data, said means for storing data communicating with said first data means and said second data means;
means for managing memory, said means for managing memory communicating data from said first data means and said second data means and said means for storing data; and
at least two sets of communication channel means, with each of said communication channel means communicating data and messaging information between said first data means, said second data means, and said means for managing memory,
wherein one set of communication channel means of the at least two sets of communication channel means provides communication from said first and second data means to said means for managing memory and another set of communication channel means of the at least two sets of communication channel means provides communication from said means for managing memory to said first and second data means,
wherein the first data means, the second data means, the interface means, the means for storing data, the means for managing memory and the at least two sets of communication channel means are embodied on a single substrate,
wherein said network switch comprises a plurality of semiconductor-implemented lookup tables therein, said plurality of lookup tables including address resolution lookup/layer three lookup, rules tables, and VLAN tables, and
wherein said first data means and said second data means share a common address lookup/layer three table, and a common VLAN table, and wherein each of the first data means and the second data means has a unique rules table associated therewith.

25. A method of handling data packets in a network switch, said method comprising the steps of:
receiving at a data port an incoming data packet;
resolving a destination address of said incoming data packet;
discarding, forwarding, or modifying the packet based upon the resolving step;
placing at least a portion of said data packet on a first communication channel, when the packet is to be forwarded,
receiving at said data port a section of another data packet on a second communication channel from a common memory; and
forwarding said another data packet from said data port;
wherein said first and second channels are separate from each other,
wherein the steps are performed in a single network switch on a single substrate with the common memory,
wherein said step of placing at least a portion of said data packet on a first communication channel further includes placing an associated control message on a third communication channel,
wherein said step of receiving at said data port a section of another data packet further comprises receiving an associated control message on a fourth communication channel from the common memory, and
wherein the first, second, third and fourth communication channels are separate but the first and third are synchronized with each other and the second and fourth are synchronized with each other.

26. A method of handling data packets as recited in claim 25, further comprising sending and receiving, by said data port, sideband message information on a fifth communication channel.

27. A method of handling data packets as recited in claim 25, wherein said network switch performs layer two switching at wirespeed.

28. A method of handling data packets as recited in claim 25, wherein said network switch performs layer three switching at wirespeed.

29. A method of handling data packets as recited in claim 25, wherein said network switch has a plurality of data ports, and wherein said step of resolving a destination address of said incoming data packet further comprises updating address information used in forwarding data packets at said plurality of data ports while the address information is received at one data port of said plurality of data ports.

* * * * *